April 14, 1936. O. C. FINCH 2,037,412
TRACTOR WHEEL ACCESSORY
Filed Nov. 21, 1935 2 Sheets-Sheet 1

Inventor
O. C. Finch
By Clarence A. O'Brien and
Hyman Berman Attorneys

April 14, 1936. O. C. FINCH 2,037,412

TRACTOR WHEEL ACCESSORY

Filed Nov. 21, 1935 2 Sheets-Sheet 2

Inventor

O. C. Finch

By Clarence A. O'Brien and
Hyman Berman
Attorneys

Patented Apr. 14, 1936

2,037,412

UNITED STATES PATENT OFFICE 2,037,412

TRACTOR WHEEL ACCESSORY

Orland C. Finch, Stockton, Kans.

Application November 21, 1935, Serial No. 50,935

4 Claims. (Cl. 301—39)

This invention relates to an accessory for use in conjunction with a lug equipped tractor wheel, said accessory being in the nature of an attachment susceptible of serving as a temporary tread structure.

It is not uncommon to provide means whereby tractor lugs may be virtually sealed or covered to permit running of the wheels on concrete and similar paved highways in an indestructible manner. The present invention relates to this special line of endeavor but has to do with a new and novel selection and adaptation of structural features calculated to permit the desired results to be more satisfactorily accomplished.

To state the case otherwise, I was faced with the problem of attempting to satisfactorily transport tractors over paved streets and highways. The tractor wheels in question are provided with circumferentially spaced transversely disposed outstanding V-shaped anti-slipping lugs. Under the circumstances, I found that it would be expedient and practicable to cut wooden blocks to proper shape so as to permit them to be placed between the existing lugs to temporarily enclose and shield the lugs and to permit the blocks to serve as a sectional rim or tread to facilitate easy and free running of the thus modified tractor wheel.

The principal novelty is predicated, not so much upon the broad idea or principle of the use of wooden space filling and rim forming blocks as it is upon the particular means, that is the retention structure, particularly selected and found practicable for assembling and holding the blocks in place in a reliable and efficient manner.

It follows, therefore, that the invention has to do with the multiple co-acting filler blocks, aptly fitted for co-action with the lugs, and so made as to cooperate with special accessories and structural details to permit the blocks to be progressively put in position and thereafter positively held in place while in rim-forming use.

The specific elements which go to make up the assemblage, constituting the primary novelty will become more readily apparent from the following description and the accompanying drawings.

Figure 1:
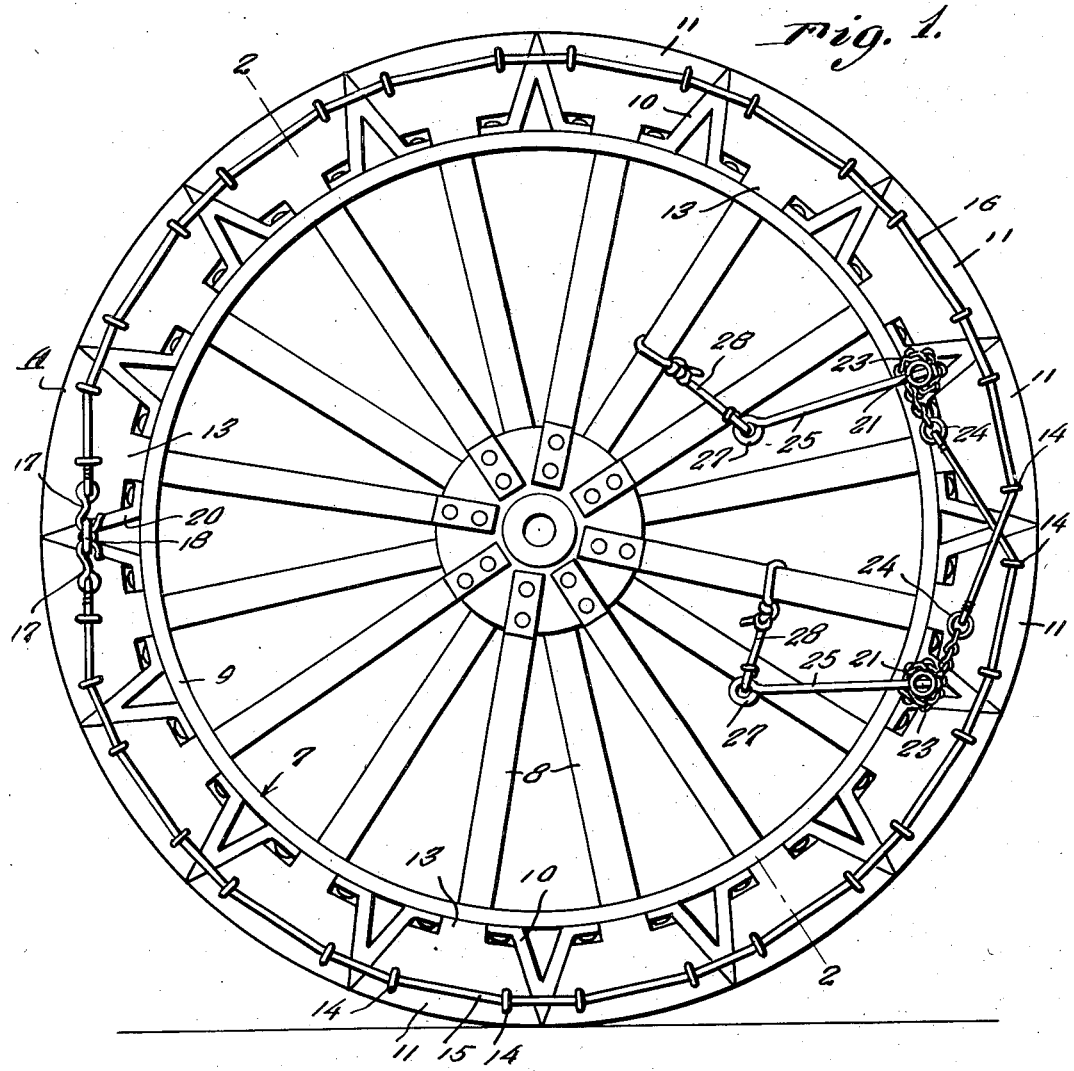
Figure 1 is a side elevational view of a conventional tractor wheel showing the temporary tread rim and associated parts in operative position.
Figure 6:
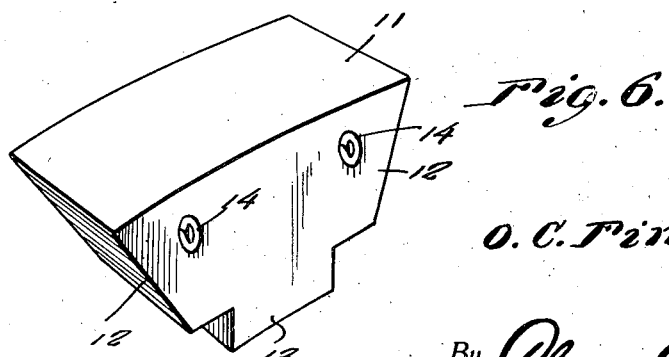
Figure 6 is a perspective showing of one of the especially designed wooden filler or tread blocks.
Figure 2:
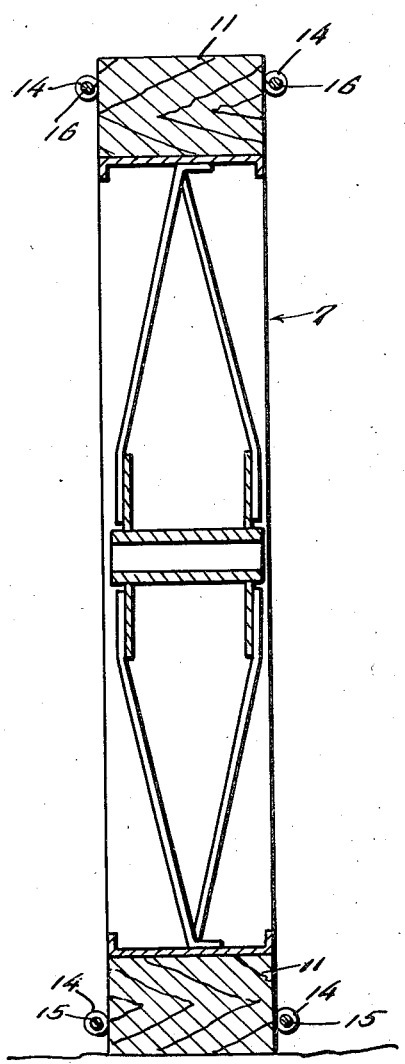
Figure 2 is a section taken approximately on the plane of the line 2—2 of Figure 1.
Figure 3:
Figure 3 is a view of one of the details which may be referred to as the ring-equipped anchoring bar or rod.
Figure 4:
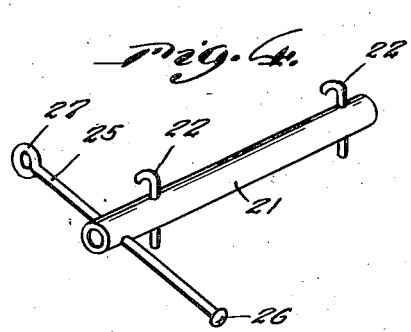
Figure 4 is a perspective drawing of a handle-equipped rotary tube which serves as a chain winding drum.
Figure 5:
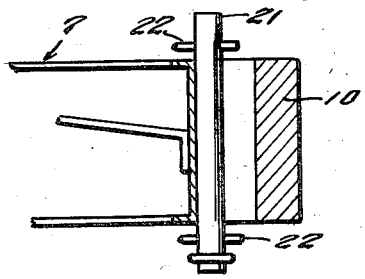
Figure 5 is a fragmentary view in section and elevation showing the manner in which the chain accommodation and winding drum is associated with one of the stock V-shaped lugs.

The tractor wheel, which is conventional, is indicated by the numeral 7 and includes customary spokes 8 and a felly or rim 9 provided with the V-shaped traction or anti-skid lugs 10. The wooden filler blocks to be used in connection with the lugs are of general segmental form and denoted by the numerals 11. All blocks are the same in construction but may be differentiated as belonging to separate opposed groups, that is, (as shown in the drawings) upper and lower duplicate assemblies. This is due to the fact that it is desirable to put the blocks around approximately one-half of the wheel, that is the upper half, and then roll the wheel over half-way and apply the remaining blocks to the then uncovered top half. For convenience of description, the distinct opposed groups of blocks may be referred to as the upper and lower sets, that is in relationship to the drawings in Figure 1. The beveled ends 12 (see Figure 6) are adapted to cooperate with the sloping sides or surfaces of the lugs. The extension or shank 13 fits between the attaching flanges of the lugs. Or stated otherwise, the blocks are merely made to fit in between the respective lugs and the surfaces of the blocks extend beyond the apex portion of the lugs. All of the blocks are provided on opposite sides with guide and retention eyes 14. These eyes serve to accommodate the connecting and retaining wires or equivalent elements. There are two of these and for convenience they are differentiated by the numerals 15 and 16. At corresponding ends, that is, at the left in Figure 1, these wires are provided with terminal hooks 17 adapted to engage the adjacent eye 18 on the anchoring rod 19. This is simply a short rod which is inserted through the starting lug 20. In other words, it is placed through the top portion of the lug so as to accommodate the respective hooks 17. Starting with the block A at the left in Figure 1, the remaining blocks 11 are inserted between the lugs forming the upper half of the wheel and the wire 16 inserted therethrough and brought around to a substantially diametrically opposite point. At this point is the chain winding pipe or drum 21 shown in Figure 4. This is of a length to extend through the selected lug 10 as shown in Figure 5.

It is provided at opposite ends with retention pins or hooks 22 to facilitate connection of the take-up chain 23. The chain is connected with the eye 24 on the free end of the cable or wire 16. It will be noted that a slidable handle member 25 is connected with one end of the drum for winding and reeling purposes. The pin or handle is provided at one end with a retaining head 26 and at the opposite end with a fastening eye 27 to which a cord, rope or the like 28 is connected. Thus after the cable is threaded through the respective eyes of the complete upper set of blocks, it is tightened by winding the chain on the drum and then the handle is pulled down to the point shown in Figure 1 and the rope 28 is attached to the eye 27 to fasten the handle in place to prevent unwinding of the chain. This holds the upper series of blocks in place so that the wheel may now be turned over and the lower blocks put in position in the same way. Inasmuch as the parts in the lower group are exactly the same as already described, the same numerals are employed to designate said parts.

Novelty is predicated on the special construction of the segmental tapered end blocks 11 fashioned with the shank portion 13 to operate with the conventional V-shaped lug wherein these blocks are provided with retention eyes 14 to be held in place by a cable or the like. Additional novelty is attached to the anchoring rod 19 connectible with the predetermined lug 20 as shown at the left in Figure 1 to facilitate anchoring of the hook 17 on one end of the tightening cable. The cable idea itself is believed to be new in that it is anchored to this special pin 19 and then threaded through the eyes 14 and adjustably connected with winding and reeling means, that is the drum 21 at the opposite end. Further than this, the chain-winding means, characterized by the slidable or adjustable handle pin 25 made to accommodate the final attaching rope 28 is believed to be an ingenious adaptation in a coordination of this character.

Broader novelty is attached to the proposition whereby through the use of one eye-equipped pin 19, both cables for the upper and lower sets of blocks may be successively mounted on an existing lug equipped wheel structure. Added to this is the adoption and use of the spaced apart selectively usable chain-winding drums and operating means therefor whereby it is possible to place the two groups or sets of blocks progressively in position. All of these features, separately and collectively, have been carefully chosen and cooperate with requisite mutuality to permit the desired results to be accomplished in a highly satisfactory and practicable manner.

It is thought that persons skilled in the art to which the invention relates will be able to obtain a clear understanding of the invention after considering the description in connection with the drawings. Therefore, a more lengthy description is regarded as unnecessary.

Minor changes in shape, size and the arrangement of details coming within the field of invention claimed may be resorted to in actual practice, if desired.

I claim:

1. In a structural assemblage of the class described, in combination, a tractor wheel including a rim having circumferentially spaced transversely disposed V-shaped lugs, an anchoring pin connected with a predetermined one of said lugs and having eyes at its opposite ends, a rotary chain accommodation and winding drum cooperable with a substantially diametrically opposite lug, an operating handle for said drum, a plurality of tread blocks fitted between the respective lugs, said blocks being provided on opposite sides with cable accommodation eyes, a pair of cables, the cables being provided at corresponding ends with hooks engageable with the eyes on said anchoring rod, the opposite corresponding ends of said cables being provided with flexible chains, means on said drum for connecting the chains thereto, and means whereby the drum may be fastened against rotation to an adjacent spoke of the wheel.

2. As a component part of an assemblage of the class described, a chain accommodation and winding device comprising a tube of a type to fit in the crotch portion of a V-shaped tractor lug, said tube extending beyond opposite portions of the lug, having chain retention pins adjacent opposite ends and provided with a slidable handle forming rod equipped at one end with a cord accommodation eye, in the manner and for the purposes described.

3. In an assemblage of the class described, a tractor wheel provided with a rim having circumferentially spaced transversely disposed V-shaped anti-slipping lugs, a plurality of individual temporary tread forming blocks arranged between said lugs completely around the periphery of the wheel, said blocks being divided into two distinct opposing groups, flexible cables connected with the respective groups of blocks, unitary and common anchoring means for adjacent ends of the cables removably connected with a predetermined anti-slipping lug dividing said groups of blocks, and independently operable cable take-up and fastening devices located on the wheel adjacent the opposite ends of the two groups of blocks, in the manner and for the purposes described.

4. As a component part of a temporary tread structure of the class described, a block assembling and retention means comprising a pair of flexible cables provided at corresponding ends with retention hooks, an anchoring pin adapted for association with a predetermined traction lug, said pin being provided at opposite ends with eyes with which the adjacent hooks detachably connect, and winding and reeling means cooperable with the opposite ends of said cables, the winding and reeling means including a structure temporarily attachable to an adjacent wheel spoke to maintain the cables taut and temporarily adjusted in place.

ORLAND C. FINCH.